US012368850B2

United States Patent
Blasi et al.

(10) Patent No.: US 12,368,850 B2
(45) Date of Patent: Jul. 22, 2025

(54) METHOD OF SIGNALING IN A VIDEO CODEC

(71) Applicant: British Broadcasting Corporation, London (GB)

(72) Inventors: Saverio Blasi, London (GB); Andre Seixas Dias, London (GB); Gosala Kulupana, London (GB)

(73) Assignee: British Broadcasting Corporation, London (GB)

( * ) Notice: Subject to any disclaimer, the term of this patent is extended or adjusted under 35 U.S.C. 154(b) by 97 days.

(21) Appl. No.: 17/619,946

(22) PCT Filed: Apr. 21, 2020

(86) PCT No.: PCT/EP2020/061053
§ 371 (c)(1),
(2) Date: Dec. 16, 2021

(87) PCT Pub. No.: WO2020/259891
PCT Pub. Date: Dec. 30, 2020

(65) Prior Publication Data
US 2022/0303536 A1    Sep. 22, 2022

(30) Foreign Application Priority Data

Jun. 25, 2019  (GB) ..................... 1909102

(51) Int. Cl.
*H04N 19/12*  (2014.01)
*H04N 19/159*  (2014.01)
(Continued)

(52) U.S. Cl.
CPC .......... *H04N 19/12* (2014.11); *H04N 19/159* (2014.11); *H04N 19/176* (2014.11); *H04N 19/625* (2014.11)

(58) Field of Classification Search
CPC .... H04N 19/12; H04N 19/159; H04N 19/176; H04N 19/625
(Continued)

(56) References Cited

U.S. PATENT DOCUMENTS 4,644,585 A * 2/1987 Crimmins .............. G06V 10/44
382/257
7,515,084 B1   4/2009 Cruz-Albrecht et al.
(Continued)

FOREIGN PATENT DOCUMENTS

CN    108141596 A    6/2018
CN    110602491      12/2019
(Continued)

OTHER PUBLICATIONS

Sharabayko et al., Effectiveness of Internal Block Prediction Methods, Proceedings of Tomsk Polytechnic University, 2013. T. 322. No. 5, with machine translation (14 pages).
(Continued)

*Primary Examiner* — Albert Kir
(74) *Attorney, Agent, or Firm* — Klintworth & Rozenblat LLP (57) ABSTRACT

Encoding of video data in a video codec involves a transform of residuals. This can be composed of a primary transform and a secondary transform. The selection of the secondary transform is effected by considering the characteristics of a block to be encoded. The selection of secondary transform can be signaled to the decoder, or inferred therein.

15 Claims, 10 Drawing Sheets

(51) Int. Cl.
*H04N 19/176* (2014.01)
*H04N 19/625* (2014.01)

(58) Field of Classification Search
USPC .................................................. 375/240.02
See application file for complete search history.

(56) References Cited

U.S. PATENT DOCUMENTS

| | | | |
|---|---|---|---|
| 9,609,343 | B1 | 3/2017 | Chen et al. |
| 10,904,522 | B2 | 1/2021 | Lim et al. |
| 11,575,901 | B2* | 2/2023 | Fan ...................... H04N 19/159 |
| 11,689,744 | B2* | 6/2023 | Koo ...................... H04N 19/176 375/240.12 |
| 2012/0008675 | A1 | 1/2012 | Karczewicz et al. |
| 2012/0314766 | A1 | 12/2012 | Chien et al. |
| 2013/0051467 | A1 | 2/2013 | Zhou et al. |
| 2013/0343648 | A1 | 12/2013 | Sato |
| 2017/0251213 | A1 | 8/2017 | Ye et al. |
| 2017/0280144 | A1 | 9/2017 | Dvir et al. |
| 2018/0098081 | A1 | 4/2018 | Zhao et al. |
| 2018/0249156 | A1 | 8/2018 | Heo et al. |
| 2018/0302631 | A1 | 10/2018 | Chiang et al. |
| 2019/0342546 | A1 | 11/2019 | Lin et al. |
| 2019/0356915 | A1 | 11/2019 | Jang et al. |
| 2021/0014493 | A1* | 1/2021 | Koo ...................... H04N 19/157 |
| 2021/0058636 | A1 | 2/2021 | Abe et al. |
| 2021/0120269 | A1* | 4/2021 | Chen .................... H04N 19/119 |
| 2022/0109876 | A1* | 4/2022 | Zhang .................. H04N 19/186 |
| 2022/0174299 | A1* | 6/2022 | Zhang .................... H04N 19/12 |
| 2022/0312012 | A1* | 9/2022 | Koo ...................... H04N 19/122 |
| 2023/0037443 | A1* | 2/2023 | Zhang .................... H04N 19/12 |

FOREIGN PATENT DOCUMENTS

| | | |
|---|---|---|
| DE | 102005052702 | 5/2007 |
| EP | 2717578 | 4/2014 |
| EP | 3217663 | 9/2017 |
| EP | 4009632 | 6/2022 |
| EP | 4017000 | 6/2022 |
| JP | 2015213367 | 11/2015 |
| JP | 6998888 | 1/2022 |
| KR | 2018/0082337 | 7/2018 |
| RU | 2584498 | 5/2013 |
| RU | 2014147451 | 6/2016 |
| WO | 2013039908 | 3/2013 |
| WO | 2016/074744 | 5/2016 |
| WO | 2017058615 A1 | 4/2017 |
| WO | 2017189048 | 11/2017 |
| WO | WO2018038554 A1 | 3/2018 |
| WO | 2018/128466 | 7/2018 |
| WO | 2018/132380 | 7/2018 |
| WO | 2018127188 | 7/2018 |
| WO | 2018132710 | 7/2018 |
| WO | 2018236031 | 12/2018 |
| WO | WO2019076138 A1 | 4/2019 |
| WO | 2019177429 | 9/2019 |
| WO | 2019201232 | 10/2019 |
| WO | 2020009357 | 1/2020 |
| WO | 2020014563 | 1/2020 |
| WO | 2018174402 | 6/2020 |

OTHER PUBLICATIONS

Bezrukov and Balobanov, "Digital Broadcasting and Applied Television Systems," Moscow Hot Line—Telecom 2016 (pp. 478, with machine translation (10 pages).
Chen et al, Algorithm Description of Joint Exploration Test Model 4, JVET, Document JVET-D1001_v3, 4th Meeting, Chengdu, CN, Oct. 15-21, 2016 (40 pages).
Abe et al, CE6: AMT and NSST complexity reduction (CE6-3.3), JVET, Document JVET-K0127-v2, 11th Meeting, Ljubljana, SI, Jul. 10-18, 2018 (6 pages).
International Search Report and Written Opinion dated Jul. 9, 2020 in connection with International Application No. PCT/EP2020/061053 (11 pages).
Combined Search and Examination Report dated Dec. 4, 2019, for United Kingdom Patent Application No. GB1909102.4 (9 pages).
Bross et al, Versatile Video Coding (Draft 5), JVET, Document JVET-N1001-v8, 14th Meeting, Geneva, CH, Mar. 19-27, 2019 (400 pages).
Z. Wang, A. C. Bovik, H. R. Sheikh, and E. P. Simoncelli, "Image Quality Assessment: From Error Visibility to Structural Similarity," IEEE Transactions on Image Processing, vol. 13, No. 4, Apr. 2004 (14 pages).
J. Silva-Martinez: "Wideband Continuous-Time Multi-Bit Delta-Sigma ADCs", Mar. 31, 2021 (Mar. 31, 2012), XP055624271, Retrieved from the Internet: URL:https://pdfs.semanticscholar.org/eb2c/d8144eca2ac3c8fb24c025ee667ffa80499b.pdf [retrieved on Sep. 19, 2019] pp. 14,20,41-p. 45 (60 pages).
J. Chen, Y. Ye, and S. H. Kim, "Algorithm description for Versatile Video Coding and Test Model 2 (VTM 2)," Tech. Rep., document JVET-K1002, 11th JVET Meeting, Ljubljana, SI, Jul. 2018 (21 pages).
G. J. Sullivan, J. Ohm, W. Han, and T. Wiegand, "Overview of the High Efficiency Video Coding (HEVC) Standard," IEEE Transactions on Circuits and Systems for Video Technology, vol. 22, No. 12, pp. 1649-1668, Dec. 2012 (20 pages).
T. Laude and J. Ostermann, "Deep Learning-Based Intra Prediction Mode Decision for HEVC," in 2016 Picture Coding Symposium (PCS), Dec. 2016 (6 pages).
T. Wang, M. Chen, and H. Chao, "A Novel Deep Learning-Based Method of Improving Coding Efficiency from the Decoder-end for HEVC," in 2017 Data Compression Conference (DCC), Apr. 2017, pp. 410-419 (11 pages).
J. Pfaff, P. Helle, D. Maniry, S. Kaltenstadler, B. Stallenberger, P. Merkle, M. Siekmann, H. Schwarz, D. Marpe, and T. Wiegand, "Intra Prediction Modes Based on Neural Networks," Tech. Rep., document JVET-J0037, 10th Meeting, San Diego, US, Apr. 2018 (19 pages).
Y. Wang, X. Fan, C. Jia, D. Zhao, and W. Gao, "Neural Network Based Inter Prediction for HEVC," in 2018 IEEE International Conference on Multimedia and Expo (ICME), Jul. 2018 (6 pages).
M. Afonso, F. Zhang, and D. R. Bull, "Video Compression Based on Spatio-Temporal Resolution Adaptation," IEEE Transactions on Circuits and Systems for Video Technology, vol. 29, No. 1, pp. 275-280, Jan. 2019 (7 pages).
T. Li, M. Xu, and X. Deng, "A Deep Convolutional Neural Network Approach for Complexity Reduction on Intra-Mode HEVC," in 2017 IEEE International Conference on Multimedia and Expo (ICME), Jul. 2017, pp. 1255-1260 (7 pages).
N. Westland, A. S. Dias, and M. Mrak, "Decision Trees for Complexity Reduction in Video Compression," in 2019 IEEE International Conference on Image Processing (ICIP), Sep. 2019 (5 pages).
M. Naccari, A. Gabriellini, M. Mrak, S. Blasi, I. Zupancic, and E. Izquierdo, "HEVC Coding Optimisation for Ultra High Definition Television Services," in 2015 Picture Coding Symposium (PCS), May 2015, pp. 20-24 (5 pages).
J. Kim, S. Blasi, A. S. Dias, M. Mrak, and E. Izquierdo, "Fast Inter-Prediction Based on Decision Trees for AV1 Encoding," in 2019 IEEE International Conference on Acoustics, Speech and Signal Processing (ICASSP), May 2019, pp. 1627-1631 (5 pages).
B. Xu, X. Pan, Y. Zhou, Y. Li, D. Yang, and Z. Chen, "CNN-Based Rate-Distortion Modeling for H.265/HEVC," in 2017 IEEE Visual Communications and Image Processing (VCIP), Dec. 2017 (4 pages).
M. Santamaria, E. Izquierdo, S. Blasi, and M. Mrak, "Estimation of Rate Control Parameter s for Video Coding Using CNN," in 2018 IEEE Visual Communications and Image Processing (VCIP), Dec. 2018 (4 pages).
G. Luz, J. Ascenso, C. Brites, and F. Pereira, "Saliency-driven Omnidirectional Imaging Adaptive Coding: Modeling and Assessment," in 2017 IEEE 19th International Workshop on Multimedia Signal Processing (MMSP), Oct. 2017 (6 pages).

(56) References Cited

OTHER PUBLICATIONS

W. Cui, T. Zhang, S. Zhang, F. Jiang, W. Zuo, Z. Wan, and D. Zhao, "Convolutional Neural Networks Based Intra Prediction for HEVC," in 2017 Data Compression Conference (DCC), Apr. 2017 (11 pages).
R. Yang, M. Xu, T. Liu, Z. Wang, and Z. Guan, "Enhancing Quality for HEVC Compressed Videos," IEEE Transactions on Circuits and Systems for Video Technology, Sep. 2017 (15 pages).
Y. Zhang, T. Shen, X. Ji, Y. Zhang, R. Xiong, and Q. Dai, "Residual Highway Convolutional Neural Networks for In-loop Filtering in HEVC," IEEE Transactions on Image Processing, vol. 27, No. 8, pp. 3827-3841, Aug. 2018 (15 pages).
R. Song, D. Liu, H. Li, and F. Wu, "Neural Network-Based Arithmetic Coding of Intra Prediction Modes in HEVC," in 2017 IEEE Visual Communications and Image Processing (VCIP), Dec. 2017 (4 pages).
Y. Li, D. Liu, H. Li, L. Li, F. Wu, H. Zhang, and H. Yang, "Convolutional Neural Network-Based Block Up-Sampling for Intra Frame Coding," IEEE Transactions on Circuits and Systems for Video Technology, vol. 28, No. 9, Feb. 2017 (15 pages).
J. Li, B. Li, J. Xu, and R. Xiong, "Intra Prediction Using Fully Connected Network for Video Coding," in 2017 IEEE International Conference on Image Processing (ICIP), Sep. 2017 (5 pages).
M. Meyer, J. Wiesner, J. Schneider, and C. Rohlfing, "Convolutional Neural Networks for Video Intra Prediction Using Cross-Component Adaptation," in 2019 IEEE International Conference on Acoustics, Speech and Signal Processing (ICASSP), May 2019, pp. 1607-1611(5 pages).
P. Helle, J. Pfaff, M. Schafer, R. Rischke, H. Schwarz, D. Marpe, and T. Wiegand, "Intra Picture Prediction for Video Coding with Neural Networks," in 2019 Data Compression Conference (DCC), Mar. 2019, pp. 448-457 (10 pages).
D.-A. Clevert, T. Unterthiner, and S. Hochreiter, "Fast and Accurate Deep Network Learning by Exponential Linear Units (ELUs)," in Proceedings of the International Conference on Learning Representations (ICLR), May 2016 (14 pages).
E. Agustsson and R. Timofte, "NTIRE 2017 Challenge on Single Image Super-Resolution: Dataset and Study," in 2017 IEEE Conference on Computer Vision and Pattern Recognition Workshops (CVPRW), Jul. 2017 (10 pages).
J. Boyce, K. Suehring, X. Li, and V. Seregin, "JVET common test conditions and software reference configurations," Tech. Rep., document JVET-J1010, 10th Meeting, San Diego, US, Apr. 2018 (6 pages).
Dhruti Patel et al, "Review on Intra-prediction in High Efficiency Video Coding (HEVC) Standard", International Journal of Computer Applications, vol. 132, No. 13, pp. 27-30, Dec. 2015 (4 pages).
J. Chen et al., "Algorithm Description for Versatile Video Coding and Test Model 5 (VTM 5)," JVET Meeting, Document JVET-N1002, Jun. 2019 (76 pages).
J. Pfaff et al., "CE3: Affine Linear Weighted lintra Prediction (CE3-41, CE3-4.2)," JVET Meeting, Document JVET-N0217, Mar. 2019 (18 pages).
A. K. Ramasubramonian et al., "Non-CE3: On Signalling of MIP Parameters," JVET Meeting, Document JVET-00755, Jun. 2019 (6 pages).
Y. Li, et al., "A Hybrid Neural Network for Chroma Intra Prediction", 2018 25th IEEE International Conference on Image Processing (ICIP), IEEE, Oct. 7, 2018, pp. 1797-1801 (6 pages).
M. Chiang, C. Hsu, Y. Huang, S. Lei, CE10.1: Combined and Multi-Hypothesis Prediction, Document JVET-K0257-v1, 11th JVET Meeting, Ljubljana, SI, Jul. 2018 (6 pages).
W. Xu, H. Yang, Y Zhao, J. Chen, CE10-related: Inter Prediction Sample Filtering, Document JVET-L0375-v1, 12th JVET Meeting, Macao, CN, Oct. 2018 (4 pages).
Examination Report issued in connection with Eurasian Patent Appl. No. EA202290141, dated Jul. 18, 2023, and English translation thereof. (17 pages).
Bossen F et al, "Non-CE3: A unified luma intra mode list construction process", No. JVETM0528, Jan. 11, 2019 (Jan. 11, 2019), 13. JVET Meeting; Jan. 9-Jan. 18, 2019; Marrakech; (The Joint Video Exploration Team of ISO/IEC JTC1/SC29/WG11 and ITU-T SG.16) (4 pages).
Jie Yao et al, "Non-CE3: Intra prediction information coding", No. JVET-M0210, Jan. 11, 2019 (Jan. 11, 2019), 13. JVET Meeting; Jan. 9-Jan. 18, 2019; Marrakech; (The Joint Video Exploration Team of ISO/IEC JTC1/SC29/WG11 and ITU-T SG.16) (8 pages).
Blasi S et al, "CE3-related: Simplified unified luma intra mode coding", No. JVET-N0303, Mar. 12, 2019 (Mar. 12, 2019), 14. JVET Meeting; Mar. 19-Mar. 27, 2019; Geneva; (The Joint Video Exploration Team of ISO/IEC JTC1/SC29/WG11 and ITU-T SG.16) (6 pages).
International Search Report and Written Opinion dated Mar. 13, 2020, in connection with International Application No. PCT/GB2019/053697 (13 pages).
International Preliminary Report on Patentability, issued by the International Bureau on behalf of the International Searching Authority Sep. 23, 2021, in connection with International Patent Application No. PCT/GB2019/053697 (11 pages).
Combined Search and Examination Report dated Sep. 9, 2019, for United Kingdom Patent Application No. GB1903170.7 (3 pages).
Combined Search and Examination Report dated Feb. 12, 2020, for United Kingdom Patent Application No. GB1903170.7 (3 pages).
International Search Report and Written Opinion dated Jan. 30, 2020, in connection with International Application No. PCT/GB2019/053489 (8 pages).
Combined Search and Examination Report dated May 30, 2019, for United Kingdom Patent Application No. GB1820459.4 (3 pages).
International Preliminary Report on Patentability, issued by the International Bureau on behalf of the International Searching Authority Jun. 8, 2021, in connection with International Patent Application No. PCT/GB2019/053489 (7 pages).
Ru-Ling Liao, Chong Soon Lim, CE10.3.1.b: Triangular Prediction Unit Mode, JVET, Document JVET-L0124-v2, 12th Meeting, Macao, CN, Oct. 3-12, 2018 (8 pages).
M. Blaser, J. Sauer, and M. R. Wien, Description of SDR and 360° Video Coding Technology Proposal by RWTH Aachen University, JVET, Document JVET-J0023, 10th Meeting, San Diego, US, Apr. 10-20, 2018 (102 pages).
Y. Ahn, H. Ryu, D. Sim, Diagonal Motion Partitions on Top of QTBT Block Structure, JVET, Document JVET-H0087, 3th Meeting, Macao, CN, Oct. 18-25, 2017 (6 pages).
M. Blaser, J. Sauer, and M. R. Wien, CE10: Results on Geometric Block Partitioning (Test 3.3), JVET, Document JVET-K0146, 11th Meeting, Ljubljana, SI, Jul. 10-18, 2018 (2 pages).
J. Chen et al, Algorithm Description for Versatile Video Coding and Test Model 3 (VTM 3), JVET, Document JVET-L1002, 12th Meeting, Macao, CN, Oct. 3-12, 2018 (48 Pages).
B. Bross et al, Versatile Video Coding (Draft 3); JVET, Document JVET-L1001-v9, 12th Meeting, Macao, CN, Oct. 3-12, 2018, (238 pages).
Combined Search and Examination Report dated Jun. 28, 2019, for United Kingdom Patent Application No. GB1821283.7 (8 pages).
International Search Report and Written Opinion dated Jan. 8, 2020, in connection with International Application No. PCT/GB2019/053124 (11 pages).
International Preliminary Report on Patentability, issued by the International Bureau on behalf of the International Searching Authority Jun. 16, 2021, in connection with International Patent Application No. PCT/GB2019/053124 (10 pages).
Chinese Office Action issued in connection with CN Patent Application No. 202080046233.9 and machine translation thereof, dated Aug. 1, 2024, 28 pages.
Xin Zhao, Description of Core Experiment 6 (CE6): Transforms and transform signalling, Joint Video Experts Team (JVET) of ITU-T SG 16 WP 3 and ISO/IEC JTC 1/SC 29/WG 11 14th Meeting: Geneva, CH, Mar. 19-27, 2019, 07 pages, Document: JVET-N1026-v1.
Xin Zhao, Description of Core Experiment 6 (CE6): Transforms and transform signalling, Joint Video Experts Team (JVET) of ITU-T SG 16 WP 3 and ISO/IEC JTC 1/SC 29/WG 11 14th Meeting: Geneva, CH, Mar. 19-27, 2019, 07 pages, Document: JVET-N1026-v2.

(56) References Cited

OTHER PUBLICATIONS

Xin Zhao, Description of Core Experiment 6 (CE6): Transforms and transform signalling, Joint Video Experts Team (JVET) of ITU-T SG 16 WP 3 and ISO/IEC JTC 1/SC 29/WG 11 14th Meeting: Geneva, CH, Mar. 19-27, 2019, 07 pages, Document: JVET-N1026-v3.

Chinese Search Report issued in connection with CN Patent Application No. 202080046233.9 and machine translation thereof, dated Aug. 1, 2024, 06 pages.

* cited by examiner

METHOD OF SIGNALING IN A VIDEO CODEC

FIELD

The present disclosure concerns video coding, and particularly, but not exclusively, the coding of video data in preparation for storage or transmission.

BACKGROUND

Various video coding technologies have been developed, with a view to processing digital video presentations, and other similar media objects. Recent developments in technology for creating video presentations has led to advances and enhancements in the level of precision, definition, detail and sophistication of such presentations. As a consequence of this, the amount of data used to construct video presentations has increased considerably.

Alongside these advances in video recording and creation technology, there is now increased user desire to acquire video presentations in digital formats, which motivate efficient file size. For instance, storage media are of finite size and, if a particularly high definition movie were to be created, without some form of encoding and/or compression, the digital file of that movie could be larger than the capacity of the storage medium.

It will be understood by the reader that a key driver for encoding and compression of digital media is the fact that distribution of media is increasingly effected by communication channels. For this, there have been substantial improvements in the speed and capacity of communication channels, through advances in physical technology (e.g. laser fibre optic communication) but also through greater efficiency in the way that data is communicated on such a channel.

However, there remains a prevailing need to consider ways of increasing efficiency of video encoding. This is both from the perspective of reducing the amount of data required to transmit a video presentation to a particular level of definition, but also to manage the level of computational complexity required to encode the video presentation at an encoder, and to decode the encoded data at a decoder.

Increasing coding efficiency in this way also has a potentially positive impact for storage of data. This will have an impact for any provider of a subscription service, with requirement to store a large number of video presentations for offer to subscribers, or broadcasters, and for recipients, who may be viewing such video presentations on devices with limited storage capacity.

More broadly, it is desirable to reduce the amount of data to be transmitted between a transmitter and a receiver, to reduce impact on network usage, and to curtail any potential financial impact to users for downloading large amounts of data on public networks.

Intra-prediction comprises performing a prediction in a block of samples in a video frame by means of using reference samples extracted from other blocks within the same frame. Such prediction can be obtained by means of different techniques, referred to as "modes" in conventional codec architectures.

In the proposed VVC (Versatile Video Coding) technology being developed by the Joint Video Experts Team (JVET), it is intended to define a plurality of possible intra-prediction modes. One of these modes can thus be used for intra-prediction, and the particular selected mode can be signaled in the bitstream, or otherwise determined at the decoder.

DESCRIPTION OF EMBODIMENTS

Aspects of the present disclosure may correspond with the subject matter of the appended claims.

In general terms, intra-prediction involves performing a primary transform and, optionally, a secondary transform, on the residual data of a given block to produce coefficient information. The coefficient information is, generally, in a compressed form with regard to the original frame data.

In the current VVC draft specification, a set of secondary transforms (referred to in the VVC specification as "low frequency non-separable transforms") may be applied for intra-coded primary transform coefficients to further reduce the energy of the residual signals. A flag is coded for each block to determine whether the block makes use of secondary transforms or not. In the case that a block makes use of secondary transforms, an inverse secondary transform matrix is applied at the decoder to recover the primary transformed coefficients.

For each secondary transform matrix (used at the encoder), there is a corresponding inverse secondary transform matrix (used at the decoder). The selection of the specific secondary transform matrix is determined by the intra prediction mode used to generate the residual signal. Furthermore, a flag is coded for each secondary transformed block to decide between one of the two possible secondary transform matrices corresponding to the intra prediction mode. In the current VVC draft specification, the secondary transforms are used regardless of the primary transform type.

Aspects of this disclosure relate to a method to simplify the secondary transforms used in a video codec in a streamlined way that may remove the unnecessary dependencies of transform/quantization pipeline on prediction pipeline, thereby enabling independent operation of the two pipelines.

Embodiments can further eliminate usage of secondary transforms in situations where the corresponding primary transforms are able to recover most of the coding performances on their own, which simplifies both the encoding and the decoding process.

Embodiments described herein are contemplated as modifications to the codecs proposed in the contemplated Versatile Video Coding (VVC) specifications. However, the reader will appreciate that the principles disclosed here have potential applicability to other scenarios beyond the scope of VVC. The scope of VVC should not be considered a limitation on the scope of this disclosure.

A first embodiment described herein comprises a method of deriving a secondary transform set, comprising a set of secondary transforms for producing residual data and corresponding coefficients, in intra-prediction.

This can be seen as a replacement for the existing intra mode based secondary transform set derivation process in the VVC draft specification. In this embodiment, secondary transform set derivation is carried out by a process based on the block dimensions. This takes advantage of the fact that, in the VVC architecture, block dimensions are readily available in the transform/quantization pipeline and therefore this prevents inter-pipeline dependencies. In addition to the block dimensions, the channel id (luma or chroma) is further incorporated to enhance the accuracy of the proposed secondary transform set derivation process.

In an embodiment, a discrimination step takes place to determine which primary transform has been employed. Except where the primary transform is obtained as an integer approximation of DCT2 (discrete cosine transform, class 2) in both the horizontal and vertical directions, the embodiment inhibits the use of secondary transforms. This simplification allows shorter encoding time as well as reduction in the decoder complexities. In comparison with the current proposals for VVC, this would completely remove one context model in the current VVC draft specification.

Aspects of the disclosure can be determined from the claims appended hereto.

Figure 1:
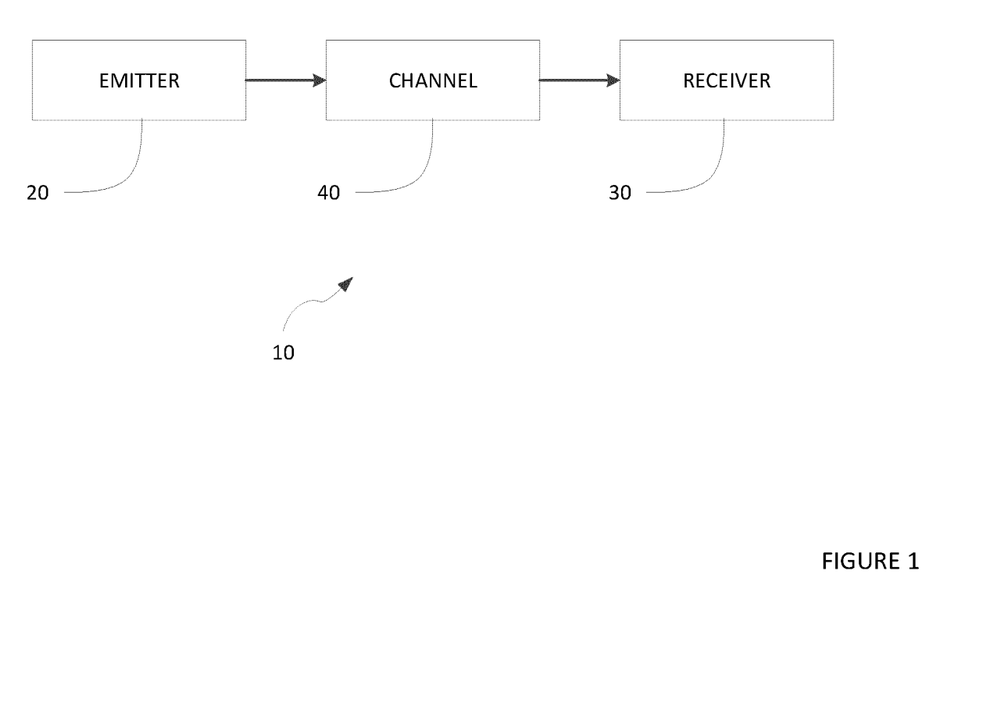
FIG. 1 is a schematic representation of a communications network in accordance with an embodiment.

As illustrated in FIG. 1, an arrangement is illustrated comprising a schematic video communication network 10, in which an emitter 20 and a receiver 30 are in communication via a communications channel 40. In practice, the communications channel 40 may comprise a satellite communications channel, a cable network, a ground-based radio broadcast network, a telephonic communications channel, such as used for provision of internet services to domestic and small business premises, fibre optic communications systems, or a combination of any of the above and any other conceivable communications medium.

Furthermore, the disclosure also extends to communication, by physical transfer, of a storage medium on which is stored a machine readable record of an encoded bitstream, for passage to a suitably configured receiver capable of reading the medium and obtaining the bitstream therefrom. An example of this is the provision of a digital versatile disk (DVD) or equivalent. The following description focuses on signal transmission, such as by electronic or electromagnetic signal carrier, but should not be read as excluding the aforementioned approach involving storage media.

Figure 2:
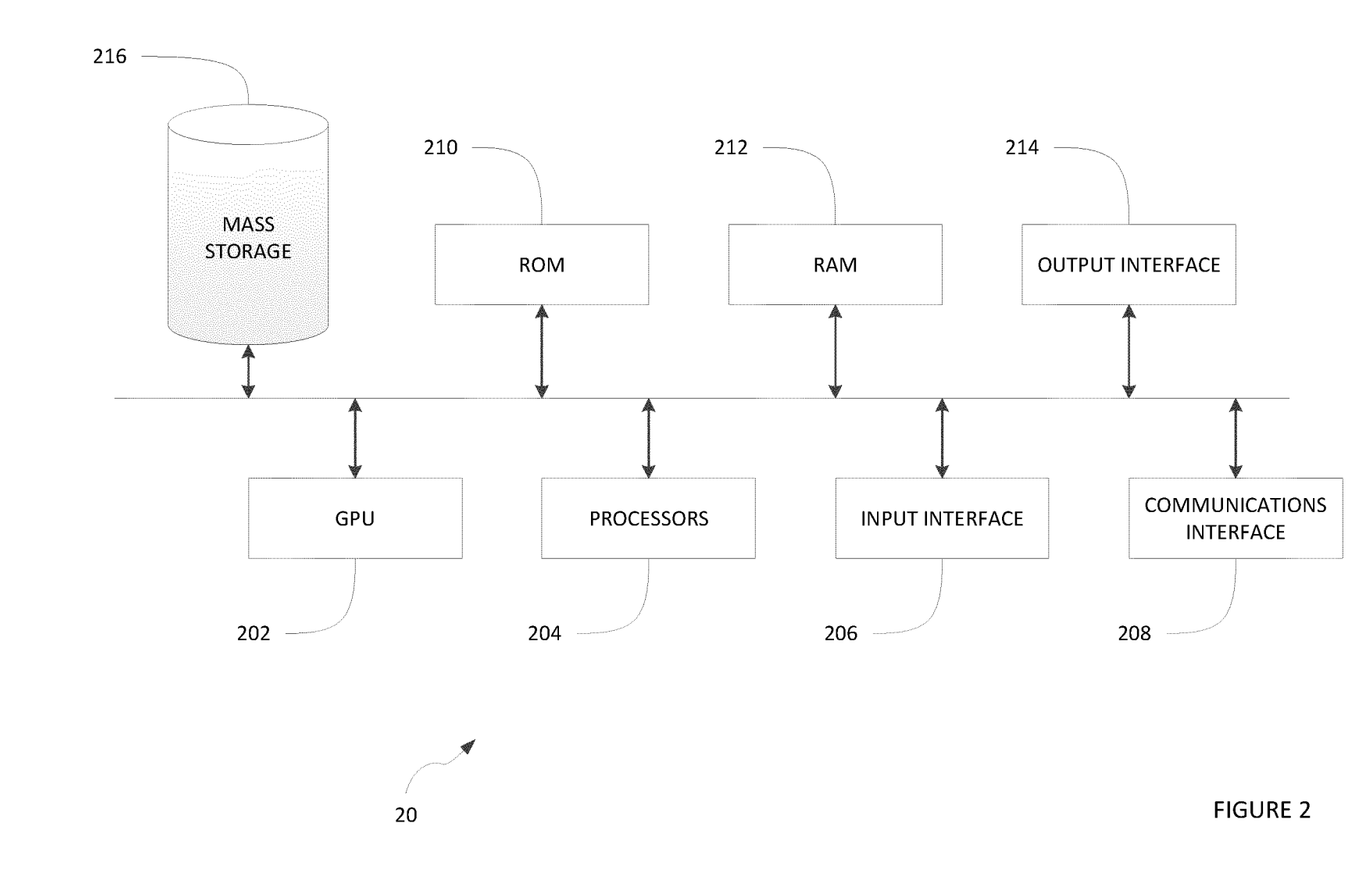
FIG. 2 is a schematic representation of an emitter of the communications network of FIG. 1.

As shown in FIG. 2, the emitter 20 is a computer apparatus, in structure and function. It may share, with general purpose computer apparatus, certain features, but some features may be implementation specific, given the specialized function for which the emitter 20 is to be put. The reader will understand which features can be of general purpose type, and which may be required to be configured specifically for use in a video emitter.

The emitter 20 thus comprises a graphics processing unit (GPU) 202 configured for specific use in processing graphics and similar operations. The emitter 20 also comprises one or more other processors 204, either generally provisioned, or configured for other purposes such as mathematical operations, audio processing, managing a communications channel, and so on.

An input interface 206 provides a facility for receipt of user input actions. Such user input actions could, for instance, be caused by user interaction with a specific input unit including one or more control buttons and/or switches, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 214 is operable to provide a facility for output of signals to a user or another device. Such output could include a display signal for driving a local video display unit (VDU) or any other device.

A communications interface 208 implements a communications channel, whether broadcast or end-to-end, with one or more recipients of signals. In the context of the present embodiment, the communications interface is configured to cause emission of a signal bearing a bitstream defining a video signal, encoded by the emitter 20.

The processors 204, and specifically for the benefit of the present disclosure, the GPU 202, are operable to execute computer programs, in operation of the encoder. In doing this, recourse is made to data storage facilities provided by a mass storage device 208 which is implemented to provide large-scale data storage albeit on a relatively slow access basis, and will store, in practice, computer programs and, in the current context, video presentation data, in preparation for execution of an encoding process.

A Read Only Memory (ROM) 210 is preconfigured with executable programs designed to provide the core of the functionality of the emitter 20, and a Random Access Memory 212 is provided for rapid access and storage of data and program instructions in the pursuit of execution of a computer program.

Figure 3:
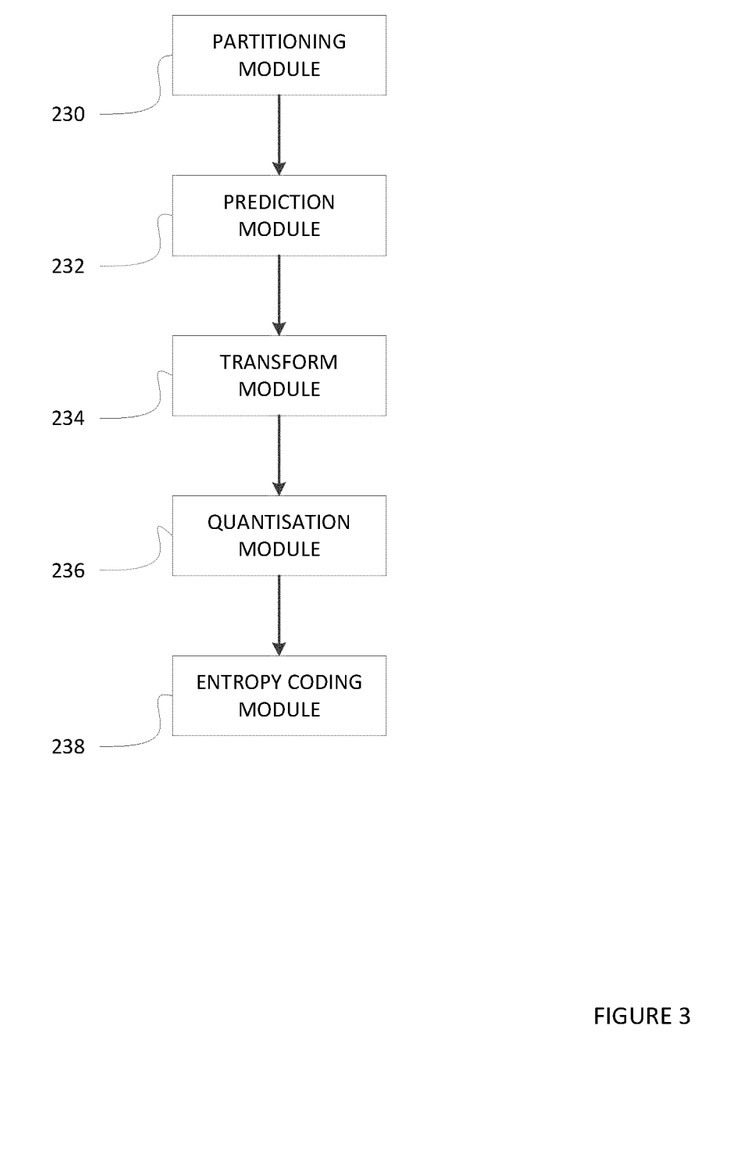
FIG. 3 is a diagram illustrating an encoder implemented on the emitter of FIG. 2.

The function of the emitter 20 will now be described, with reference to FIG. 3. FIG. 3 shows a processing pipeline performed by an encoder implemented on the emitter 20 by means of executable instructions, on a datafile representing a video presentation comprising a plurality of frames for sequential display as a sequence of pictures.

The datafile may also comprise audio playback information, to accompany the video presentation, and further supplementary information such as electronic program guide information, subtitling, or metadata to enable cataloguing of the presentation. The processing of these aspects of the datafile are not relevant to the present disclosure.

Referring to FIG. 3, the current picture or frame in a sequence of pictures is passed to a partitioning module 230 where it is partitioned into rectangular blocks of a given size for processing by the encoder. This processing may be sequential or parallel. The approach may depend on the processing capabilities of the specific implementation.

Each block is then input to a prediction module 232, which seeks to discard temporal and spatial redundancies present in the sequence and obtain a prediction signal using previously coded content. Information enabling computation of such a prediction is encoded in the bitstream. This information should comprise sufficient information to enable computation, including the possibility of inference at the receiver of other information necessary to complete the prediction.

The prediction signal is subtracted from the original signal to obtain a residual signal. This is then input to a transform module 234, which attempts to further reduce spatial redundancies within a block by using a more suitable representation of the data. Employment of domain transformation, or otherwise, may be signaled in the bitstream.

The resulting signal is then typically quantised by quantisation module 236, and finally the resulting data formed of the coefficients and the information necessary to compute the prediction for the current block is input to an entropy coding module 238 makes use of statistical redundancy to represent the signal in a compact form by means of short binary codes. Again, the reader will note that entropy coding may, in some embodiments, be an optional feature and may be dispensed with altogether in certain cases. The employment of entropy coding may be signaled in the bitstream, together with information to enable decoding, such as an index to a mode of entropy coding (for example, Huffman coding) and/or a code book.

By repeated action of the encoding facility of the emitter 20, a bitstream of block information elements can be constructed for transmission to a receiver or a plurality of receivers, as the case may be. The bitstream may also bear information elements which apply across a plurality of block information elements and are thus held in bitstream syntax independent of block information elements. Examples of such information elements include configuration options, parameters applicable to a sequence of frames, and parameters relating to the video presentation as a whole.

Figure 4:
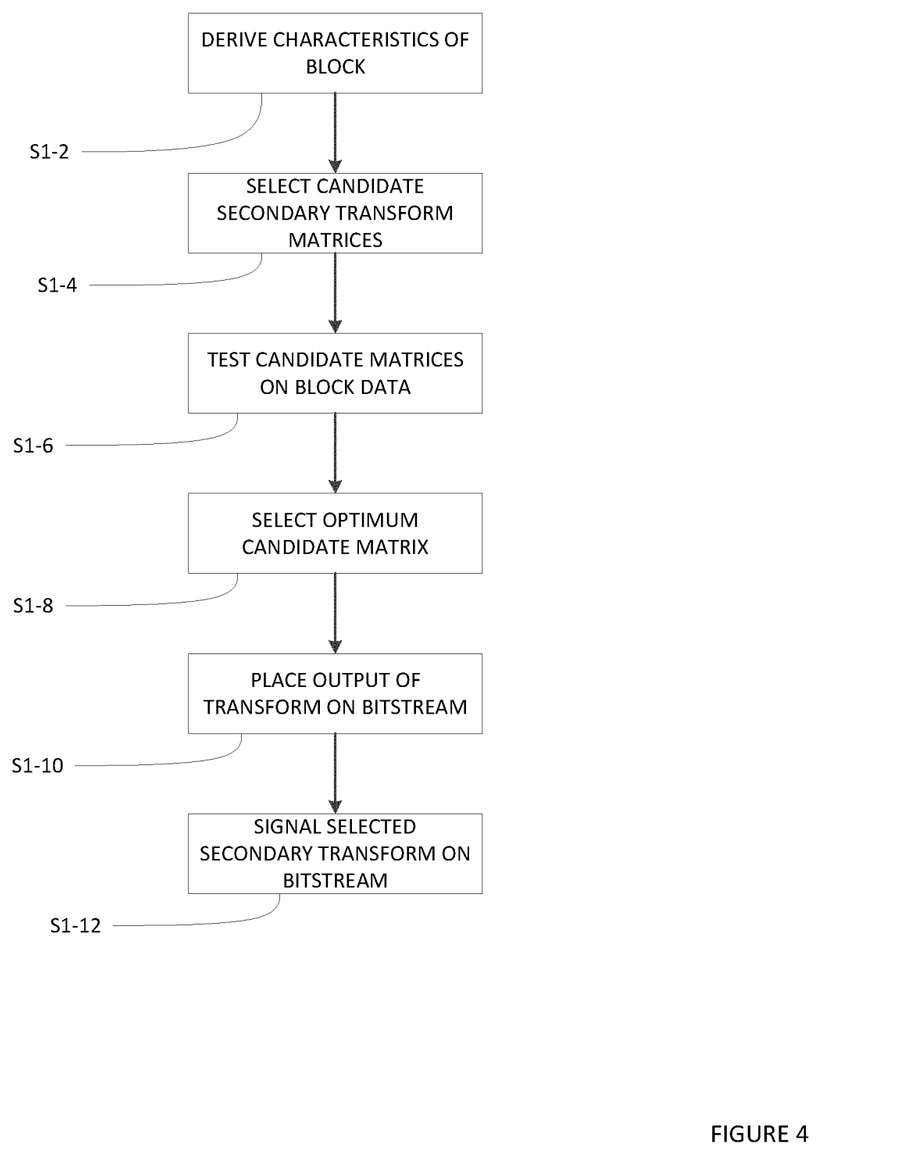
FIG. 4 is a flow diagram of a transform selection process performed at a transform module of the encoder of FIG. 3, in accordance with a first specific embodiment.

The transform module 234 will now be described in further detail, with reference to FIG. 4. As will be understood, this is but an example, and other approaches, within the scope of the present disclosure and the appended claims, could be contemplated.

The following process is performed on each block in a frame.

The transform process comprises a process of deriving a transform matrix for deriving a secondary transform matrix for use in the transform module 234.

In the specific context of the draft VVC proposals, existing approaches rely on basing derivation of secondary transform matrices on the intra prediction mode employed in the specific case. Instead, in the present embodiment, the secondary transform matrices are derived from other features of the block, including characteristics of the coefficients within the block (step S1-2), such as whether they belong to a chrominance ("chroma") or luminance ("luma") colour component, or the number of non-zero coefficients contained within the block or within a certain area inside the block, and/or including other physical characteristics of the block, such as its dimensions, or the ratio between its height and width.

In a first step, a set of possible secondary transform matrices, defined for the codec, is considered. Two of these are selected (step S1-4), for transformation of the primary residuals of luma blocks. The selection of the secondary transform matrices for each block is dependent on the block dimensions, the colour component of the current block, and/or the ratio between the block height and width.

A determination is then made as to which of these selected secondary transform matrices is to be used (step S1-6). This determination can be performed with any suitable technique, for instance it may be made on the basis of the efficiency of the resultant transformation—i.e. which transform produces the most effective coding of the residual data (step S1-8). Along with the transformed residual data (S1-10), the correct inverse secondary transform matrix to be used, among those in the selection, is signaled to the decoder in the bit stream (step S1-12).

Alternatively, in another case of the first embodiment, three secondary transform matrices are selected from the set of possible secondary transform matrices used in the VVC draft specification to transform the primary residuals of the luma blocks. The selection of the secondary transform matrices for each block is again dependent on the block dimensions, the colour component of the current block, and/or the ratio between the block height and width.

A determination is then made as to which of these selected secondary transform matrices is to be used. This determination can be performed with any suitable technique, for instance it may be made on the basis of the efficiency of the resultant transformation—i.e. which transform produces the most effective coding of the residual data. The correct inverse secondary transform matrix to be used, among those in the selection, is signaled to the decoder in the bit stream.

Further alternatively, in another case of the first embodiment, either two or three secondary transform matrices are selected from the set of possible secondary transform matrices used in the VVC draft specification to transform the primary residuals of the luma blocks. The number of possible secondary transforms in the selection as well as the selection of the secondary transform matrices for each block is dependent on the block dimensions, the colour component of the current block, and/or the ratio between the block height and width.

Again, a determination is made as to which of these selected secondary transform matrices is to be used. This determination can be performed with any suitable technique, for instance it may be made on the basis of the efficiency of the resultant transformation—i.e. which transform produces the most effective coding of the residual data. The correct inverse secondary transform matrix to be used among those in the selection is signaled to the decoder in the bit stream.

Further alternatively, in another case of the first embodiment, even more than three secondary transform matrices are selected from the set of possible secondary transform matrices used in the VVC draft specification to transform the primary residuals of the luma blocks. The number of possible secondary transforms in the selection as well as the selection of the secondary transform matrices for each block is dependent on the block dimensions, the colour component of the current block, and/or the ratio between the block height and width. Once a determination has been made as to which of the selected secondary transforms should be used, the correct inverse secondary transform matrix to be used among those in the selection is signaled to the decoder in the bit stream.

Figure 5:
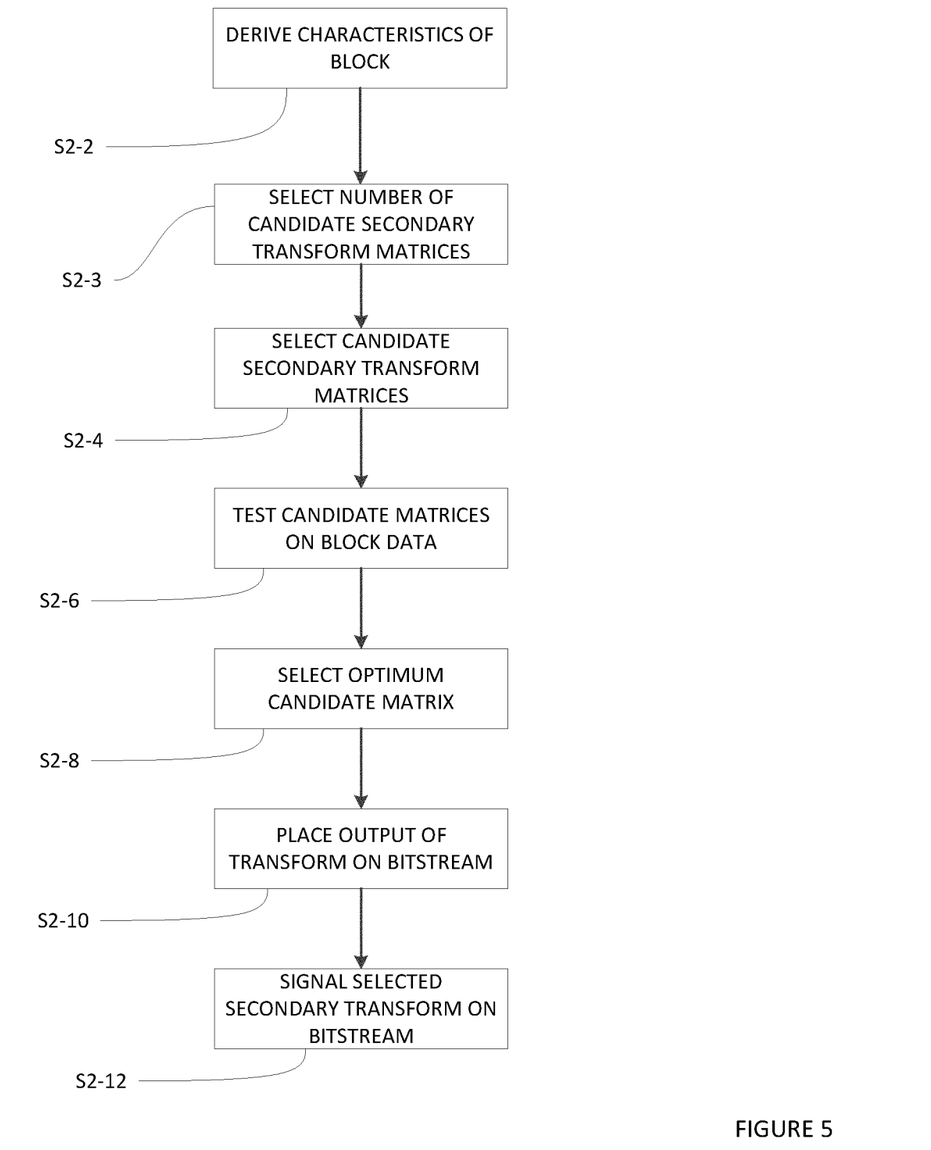
FIG. 5 is a flow diagram of a transform selection process performed at a transform module of the encoder of FIG. 3, in accordance with a second specific embodiment.

In a second embodiment, which can be combined with the first embodiment, the number of possible secondary transforms in the selection and/or the selection of the secondary transform matrices for each block is dependent on the number of non-zero coefficients that are signaled in the bitstream to the decoder. As illustrated in FIG. 5, a process according to this embodiment involves the same steps (renumbered as S2-xx rather than S1-xx) as shown in FIG. 4 with regard to the first embodiment, but with a step S2-3 intervening between step S2-2 and step S2-4 of determining the number of candidate matrices to be selected.

Alternatively, the number of possible secondary transforms in the selection and/or the selection of the secondary transform matrices for each block is dependent on the magnitude and sign of certain selected coefficients within the block. For instance, a modulo operator is applied to one or more coefficients to determine which of the possible secondary transform matrices should be used for the current block.

In a third embodiment, which can be combined with the first and/or the second embodiment, the usage of secondary transforms can be eliminated for certain primary transform types. This can have advantages in terms of cost of signaling the secondary transforms, as the signaling may be avoided for certain blocks thus reducing the bitrate. Additionally, this may have advantages in terms of potential reduction of complexity at the encoder, as the encoder need not search for the optimal secondary transform option in certain blocks. Additionally, this may have advantages due to potential reductions in complexity at the decoder, as the decoder need not include inverse secondary transform capabilities for certain block types.

In one case of this embodiment, the usage of secondary transforms is removed for all the primary transform types except when an integer approximation of DCT2 is used in both the horizontal and vertical direction. The correct inverse secondary transform matrix for residual blocks which are transformed using an integer approximation of DCT2 in both the horizontal and vertical direction is signaled in the bit stream.

Figure 6:
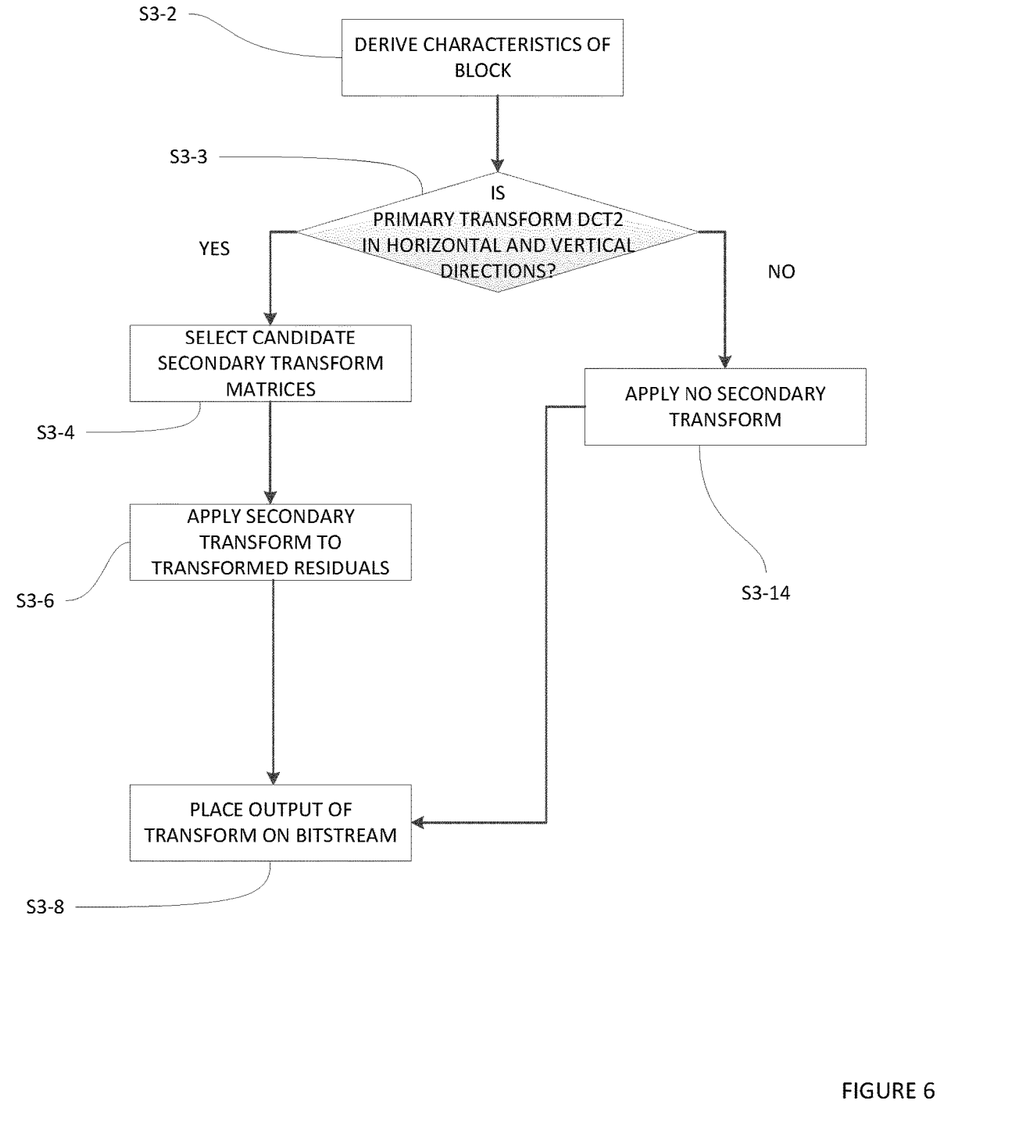
FIG. 6 is a flow diagram of a transform selection process performed at a transform module of the encoder of FIG. 3, in accordance with a third specific embodiment.

As shown in FIG. 6, this process involves determining in a preliminary step whether DCT2 has been used in both the horizontal and vertical direction (step S3-3). Then, if DCT2 is employed in the primary transform, candidate secondary transform matrices are selected (step S3-4), a selected secondary transform is applied to the residuals transformed by the primary transform, and the secondary transform selection is signaled on the bitstream (step S3-8). The transform output is placed on the bitstream (step S3-10). On the other hand, if DCT2 is not employed in the primary transform, the secondary transform is bypassed (step S3-14) and the residuals transformed by the primary transform are placed on the bitstream (step S3-10).

In another case of the third embodiment, the usage of secondary transforms is removed for all the primary transform types except for the cases when an integer approximation of DCT2 was used in both the horizontal and vertical direction, for specific block dimensions. The correct inverse secondary transform matrix for residual blocks which are transformed using primary transforms is signaled in the bit stream.

In a fourth embodiment, which can be combined with the first, and/or the second, and/or the third embodiment, the usage of a secondary transform is not explicitly signaled to the decoder in the bitstream, but it is instead decided upon the application of an inference process which is applicable at both the encoder and decoder side. This may have advantages in terms of reducing the number of bits required to signal the secondary transform information.

In one case of this embodiment, the inference process to determine whether secondary transform is applied to the current block may depend on the number of non-zero coefficients that are transmitted in the bitstream. Alternatively, the inference process to determine whether secondary transform is applied to the current block is dependent on the magnitude and sign of certain selected coefficients within the block. For instance, a modulo operator is applied to one or more coefficients to determine whether a secondary transform is applied to the current block or not.

Figure 7:
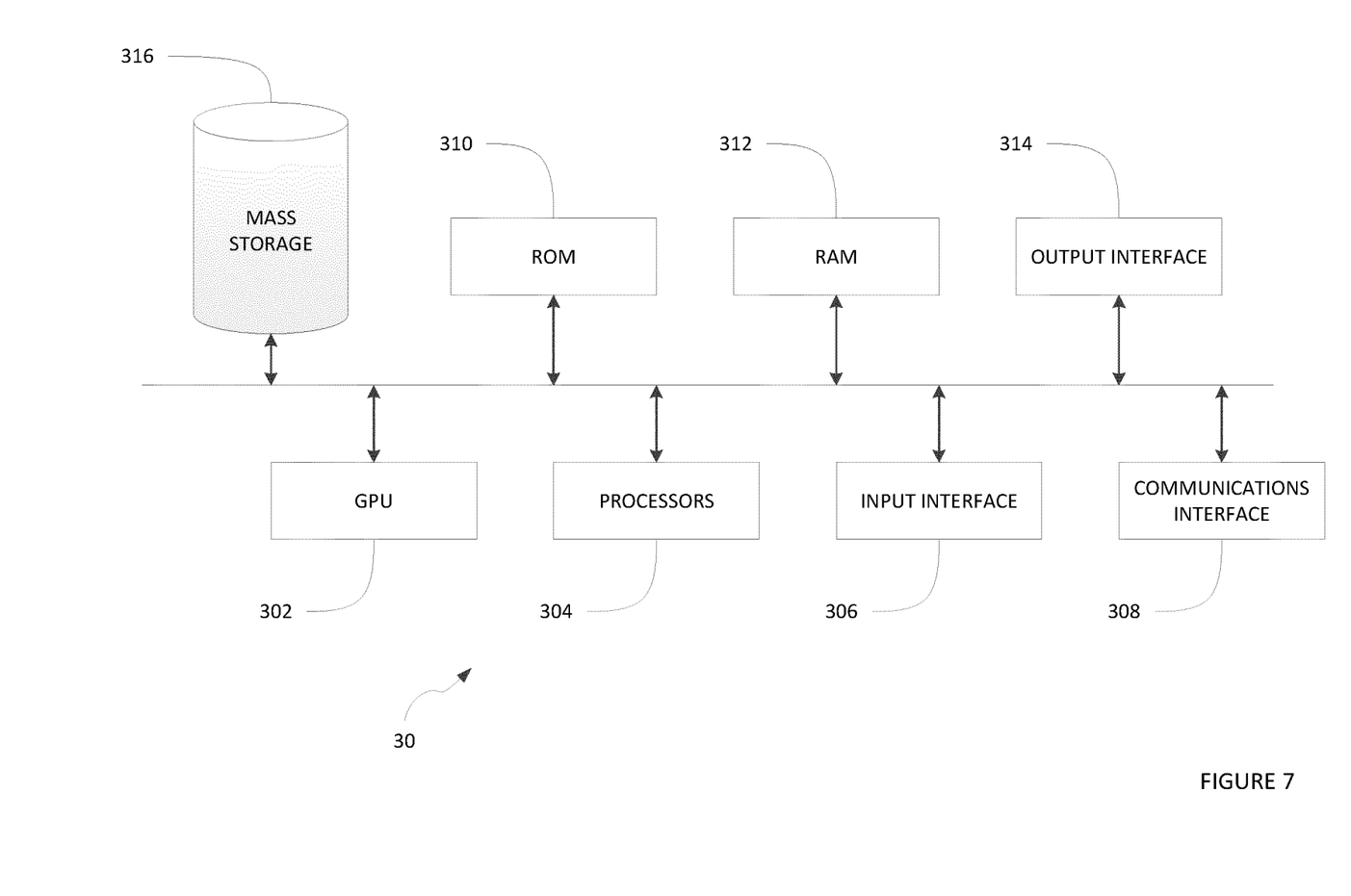
FIG. 7 is a schematic representation of a receiver of the communications network of FIG. 1.

The structural architecture of the receiver is illustrated in FIG. 7. It has the elements of being a computer implemented apparatus. The receiver 30 thus comprises a graphics processing unit 302 configured for specific use in processing graphics and similar operations. The receiver 30 also comprises one or more other processors 304, either generally provisioned, or configured for other purposes such as mathematical operations, audio processing, managing a communications channel, and so on.

As the reader will recognize, the receiver 30 may be implemented in the form of a set-top box, a hand held personal electronic device, a personal computer, or any other device suitable for the playback of video presentations.

An input interface 306 provides a facility for receipt of user input actions. Such user input actions could, for instance, be caused by user interaction with a specific input unit including one or more control buttons and/or switches, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 314 is operable to provide a facility for output of signals to a user or another device. Such output could include a television signal, in suitable format, for driving a local television device.

A communications interface 308 implements a communications channel, whether broadcast or end-to-end, with one or more recipients of signals. In the context of the present embodiment, the communications interface is configured to cause emission of a signal bearing a bitstream defining a video signal, encoded by the receiver 30.

The processors 304, and specifically for the benefit of the present disclosure, the GPU 302, are operable to execute computer programs, in operation of the receiver. In doing this, recourse is made to data storage facilities provided by a mass storage device 308 which is implemented to provide large-scale data storage albeit on a relatively slow access basis, and will store, in practice, computer programs and, in the current context, video presentation data, resulting from execution of an receiving process.

A Read Only Memory (ROM) 310 is preconfigured with executable programs designed to provide the core of the functionality of the receiver 30, and a Random Access Memory 312 is provided for rapid access and storage of data and program instructions in the pursuit of execution of a computer program.

Figure 8:
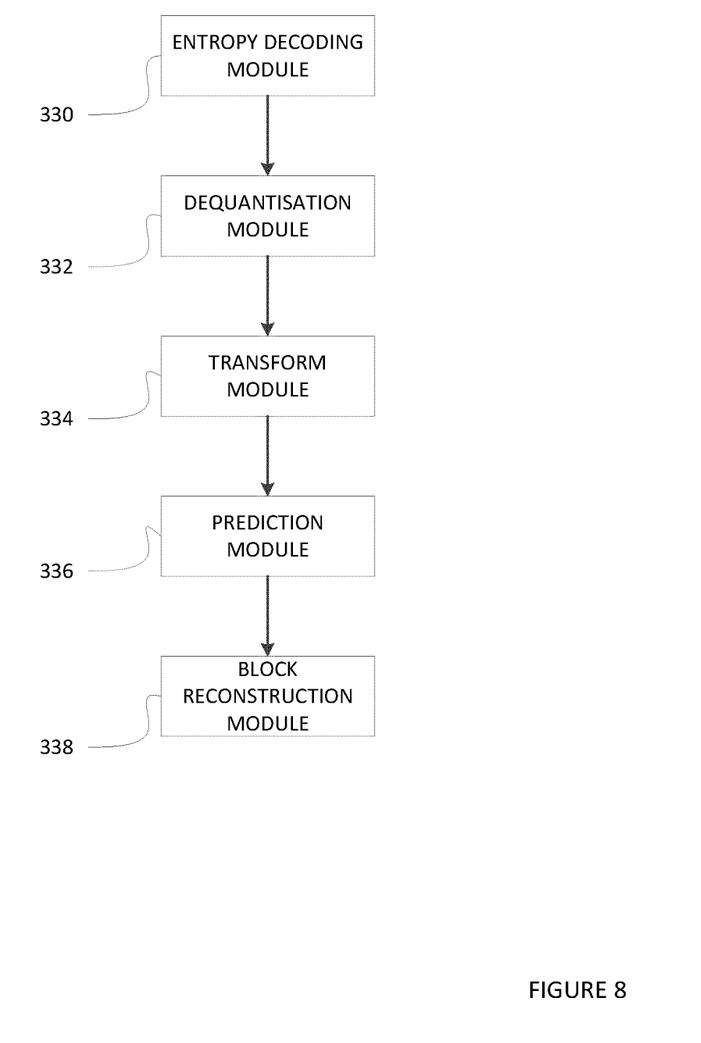
FIG. 8 is a diagram illustrating a decoder implemented on the receiver of FIG. 7.

The function of the receiver 30 will now be described, with reference to FIG. 8. FIG. 8 shows a processing pipeline performed by a decoder implemented on the receiver 20 by means of executable instructions, on a bitstream received at the receiver 30 comprising structured information from which a video presentation can be derived, comprising a reconstruction of the frames encoded by the encoder functionality of the emitter 20.

The decoding process illustrated in FIG. 8 aims to reverse the process performed at the encoder. The reader will appreciate that this does not imply that the decoding process is an exact inverse of the encoding process.

A received bit stream comprises a succession of encoded information elements, each element being related to a block. A block information element is decoded in an entropy decoding module 330 to obtain a block of coefficients and the information necessary to compute the prediction for the current block. The block of coefficients is typically dequantised in dequantisation module 332 and typically inverse transformed to the spatial domain by transform module 334. A specific aspect of the operation of the transform module 334 is illustrated further in FIG. 9 and will be described in due course.

As noted above, the reader will recognize that entropy decoding, dequantisation and inverse transformation would only need to be employed at the receiver if entropy encoding, quantisation and transformation, respectively, had been employed at the emitter.

A prediction signal is generated as before, from previously decoded samples from current or previous frames and using the information decoded from the bit stream, by prediction module 336. A reconstruction of the original picture block is then derived from the decoded residual signal and the calculated prediction block in the reconstruction block 338. The prediction module 336 is responsive to information, on the bitstream, signaling the use of intra-prediction and, if such information is present, reading from the bitstream information which enables the decoder to determine which intra-prediction mode has been employed and thus which prediction technique should be employed in reconstruction of a block information sample.

By repeated action of the decoding functionality on successively received block information elements, picture blocks can be reconstructed into frames which can then be assembled to produce a video presentation for playback.

An exemplary decoder algorithm, complementing the encoder algorithm described earlier, is illustrated in FIG. 9.

As noted previously, the decoder functionality of the receiver 30 extracts from the bitstream a succession of block information elements, as encoded by the encoder facility of the emitter 20, defining block information and accompanying configuration information.

In general terms, the decoder avails itself of information from prior predictions, in constructing a prediction for a present block. In doing so, the decoder may combine the knowledge from inter-prediction, i.e. from a prior frame, and intra-prediction, i.e. from another block in the same frame.

Figure 9:
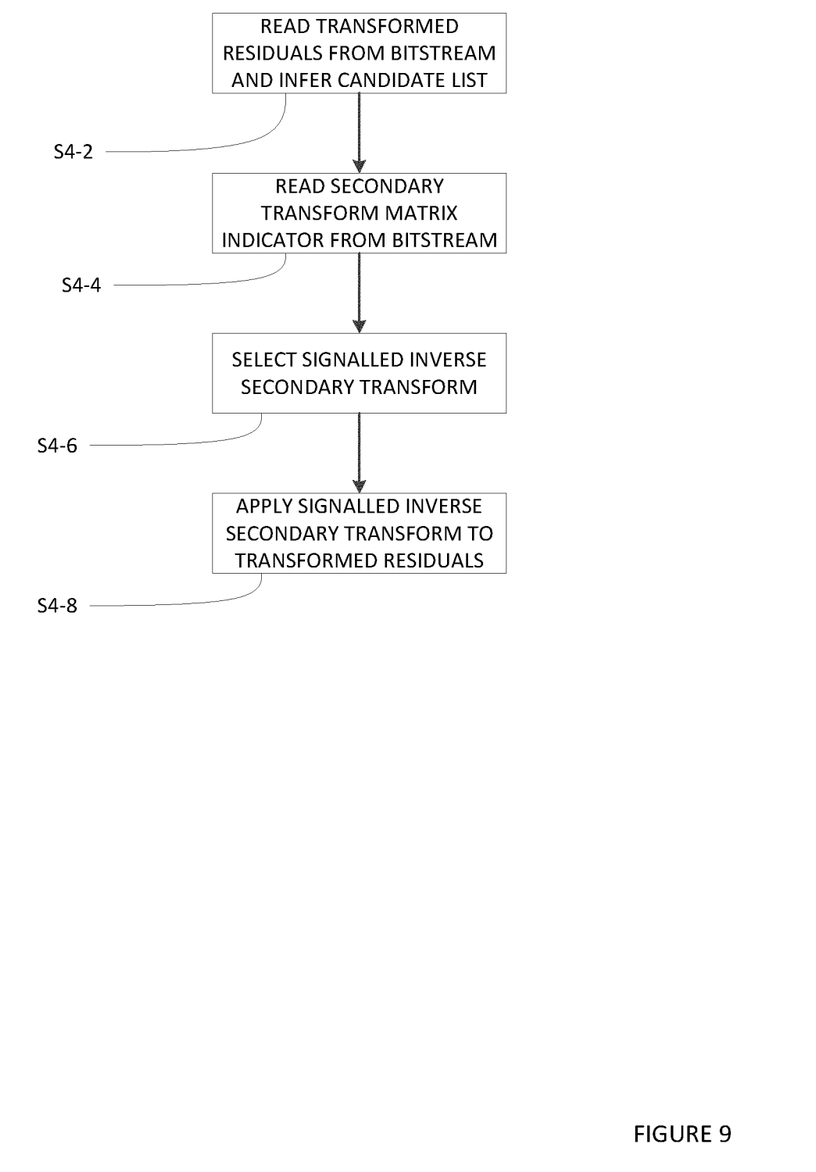
FIG. 9 is a flow diagram of a secondary inverse transform process at the decoder of FIG. 8, in accordance with a first configuration.

Specifically, the inverse transform (comprising a primary inverse transform and, optionally, a secondary inverse transform) is signaled in the bitstream, and this governs the operation of the transform module 334. The implementation of encoder embodiments described above, do not affect the operation of the decoder.

In particular, and with reference to the first embodiment of the encoder above, the decoder is operable to read, from the bitstream, the transformed residuals to be transformed back into the spatial domain (step S4-2). The decoder may read from the bitstream information regarding whether the block of transformed residuals needs to be inverse transformed using an inverse secondary transform followed by an inverse primary transform, or whether it only requires inverse transforming using an inverse primary transform.

Alternatively, the decoder may apply an inference process to the bitstream, to determine, in correspondence with the encoder, whether inverse secondary transform needs to be applied to the current block or not. This process may depend for instance on the number of non-zero coefficients in the block, or on the magnitude and sign of certain selected coefficients within the block. For instance, a modulo operator is applied to one or more coefficients to determine whether inverse secondary transform is required to be applied to the current block or not.

In case the decoder identifies that a block requires inverse secondary transform, the decoder applies an inference process to the bitstream, to determine, in correspondence with the encoder, which of the pre-stored inverse secondary transform matrices may be candidates for use. Part of the inference process will be based on characteristics of the block for which decoding is taking place. As before, these characteristics can include whether the block is chroma or luma data, the size of the block, the ratio of height to width of the block, and the non-zero population of the block. A further part of the inference process may, optionally, include how many candidates to select, i.e. 1, 2, 3 or another number, corresponding to the examples given above for the encoder. A further part of the inference process may, optionally, include information on the prediction mode used to compute the prediction on the current block.

Accompanying the transformed residuals data, a secondary transform matrix indicator is read from the bitstream (step S4-4), indicating to the decoder which of the inferred candidate selection is to be used.

The signaled inverse secondary transform is loaded into memory for use (step S4-6) and, finally, this inverse transform is applied to the data (step S4-8).

The reader will understand that the process in FIG. 9 will be supplemented then by an inverse primary transform operation. In some embodiments, the primary transform to be used will also be signaled in the bitstream. However, it may also be the case that the particular primary transform used for a block can be inferred, so there may be no need for signaling the primary transform on the bitstream.

The reader will also appreciate that suitable modifications can be made to this process. For instance, it may be the case that the data was encoded without application of a secondary transform. In this case, this scenario can be signaled on the bitstream, and the decoder can be responsive to that signal to omit the secondary transform. On the other hand, it may be that the particular characteristics of the block enable inference at the decoder that no secondary transform has been applied, in which case no signaling on the bitstream is necessary and no facility need be implemented at the decoder to enable detection of such signaling.

Figure 10:
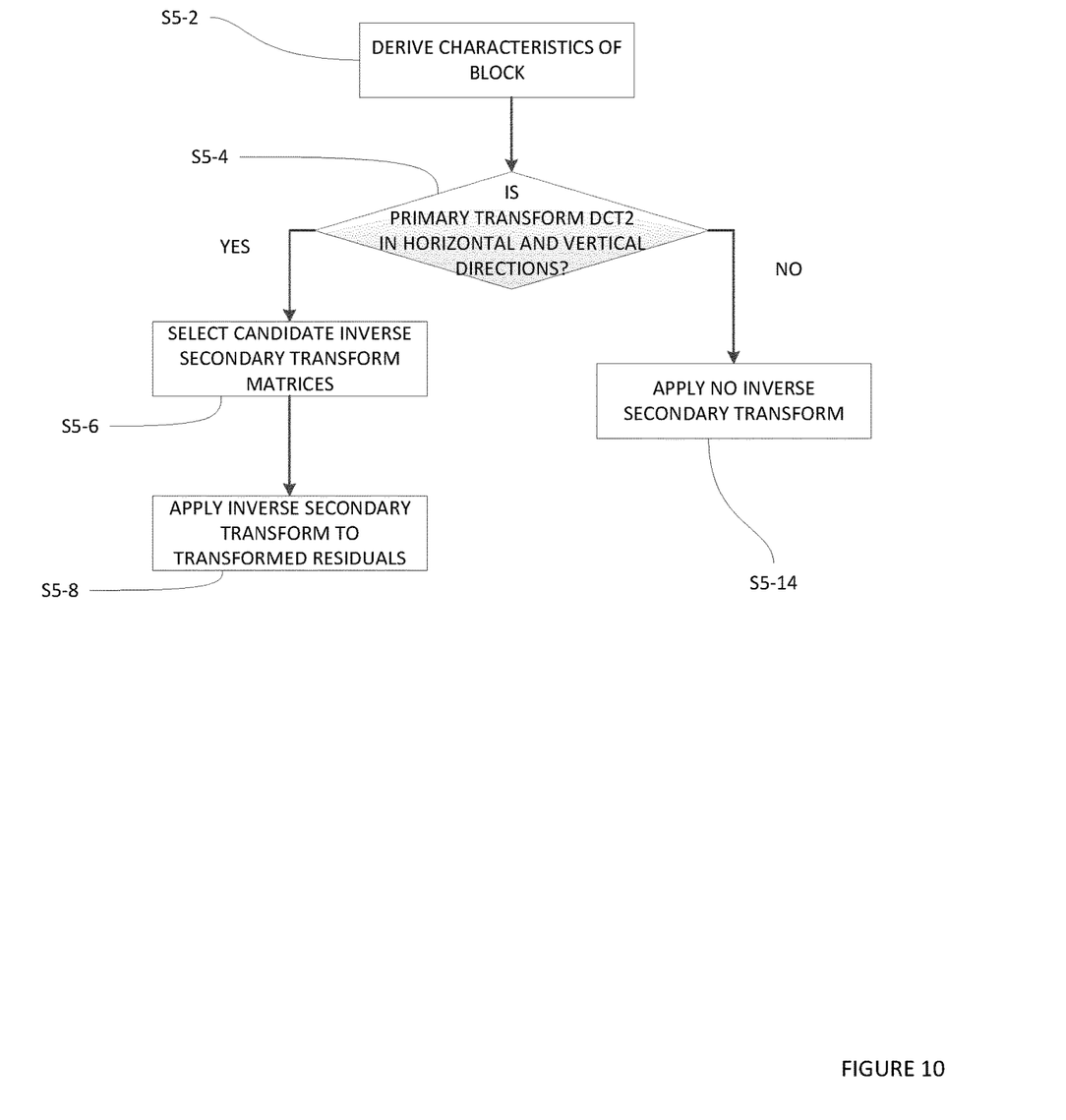
FIG. 10 is a flow diagram of a secondary inverse transform process at the decoder of FIG. 8, in accordance with a second configuration.

FIG. 10 illustrates such an implementation. In this implementation, for example, the decoder derives characteristics of the block to be decoded (step S5-2) and thence makes a decision (step S5-4) based on whether the primary transform used to encode the residuals is an integer approximation of DCT2 in both horizontal and vertical directions. Based on that, the decoder can infer whether or not a secondary transform has been applied and thus needs to be inverted. If DCT2 has been used, then candidate inverse secondary transform matrices are selected (step S5-6) and the correct one is applied (step S5-8). On the other hand, if DCT2 has not been used, then the decoder will be able to infer that no secondary transform has been applied (step S5-14).

For the purpose of constructing a practical algorithm for performing the disclosed decoding process, it may be convenient to consider the determination that no secondary transform is to be applied, as equivalent to applying a null or identity transform. That is, by setting the secondary transform to the identity matrix I, this is equivalent to applying no transform at all.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A decoder for decoding an encoded bitstream representative of a block of a frame of video, the decoder comprising:
    an inverse transform module comprising executable instructions that cause one or more processors to:
    determine a total number of non-zero coefficients contained in the block to be decoded,
    determine a set of candidate inverse secondary transform matrices on the basis of the determined total number of non-zero coefficients contained in the block, wherein the set of candidate inverse secondary transform matrices comprises a plurality of inverse secondary transform matrices, and wherein determining the set of candidate inverse secondary transform matrices comprises determining a candidate number on the basis of the determined total number of non-zero coefficients contained in the block, the candidate number determining how many candidate inverse secondary transform matrices are to be determined in the set of candidate inverse secondary transform matrices,
    select an inverse secondary transform matrix from the set of candidate inverse secondary transform matrices based on a signal received on the encoded bitstream, and
    apply an inverse matrix transformation to transformed residual information, to extract untransformed residual information, the inverse matrix transformation being governed by the inverse secondary transform matrix and an inverse primary transform matrix; and
    an intra-prediction module comprising executable instructions that cause the one or more processors to compute a prediction of the block in accordance with an intra-prediction mode and reconstructing the block by combining the inverse transformed residual data with the prediction.

2. A decoder in accordance with claim 1, wherein the inverse transform module further causes the one or more processors to determine the set of candidate inverse secondary transform matrices on the basis of whether the block comprises chrominance data or luminance data.

3. A decoder in accordance with claim 1 wherein the inverse transform module further causes the one or more processors to determine the set of candidate inverse secondary transform matrices on the basis of a dimensional characteristic of the block.

4. A decoder in accordance with claim 3 wherein the dimensional characteristic comprises at least one of height or width of the block.

5. A decoder in accordance with claim 1, wherein the inverse transform module further causes the one or more processors to select the inverse secondary transform matrix on the basis of the selection of a primary transform matrix.

6. A decoder in accordance with claim 1, wherein the inverse transform module further causes the one or more processors to apply no secondary transform dependent on a primary transform matrix being a predetermined character.

7. A decoder in accordance with claim 6, wherein the predetermined character of the primary transform matrix comprises that it be derived as an integer approximation of a discrete cosine transform used in the horizontal and vertical directions.

8. A decoder in accordance with claim 7 wherein the discrete cosine transform is DCT2.

9. A method of decoding encoded transformed residual information for a block of a frame of video, the method comprising:
    determining a total number of non-zero coefficients contained in the block to be decoded;
    determining a set of candidate inverse secondary transform matrices on the basis of the total number of non-zero coefficients contained in the block to be decoded, wherein the set of candidate inverse secondary transform matrices comprises a plurality of inverse secondary transform matrices, and determining the set of candidate inverse secondary transform matrices comprises determining a candidate number on the basis of the determined total number of non-zero coefficients contained in the block, the candidate number determining how many candidate inverse secondary transform matrices are to be determined in the set of candidate inverse secondary transform matrices;
    selecting an inverse secondary transform matrix from the set of candidate inverse secondary transform matrices based on a signal received on a bitstream;
    inverse transforming the residual information applying an inverse secondary transform and an inverse primary transform, to extract untransformed residual information, wherein the inverse secondary transform is computed on the basis of the inverse secondary transform matrix;
    computing a prediction of the current block in accordance with an intra-prediction mode; and
    reconstructing the block by combining the inverse transformed residual data with the prediction.

10. A method in accordance with claim 9, wherein the method further comprises determining the set of candidate inverse secondary transform matrices on the basis of whether the block comprises chrominance data or luminance data.

11. A method in accordance with claim 9, wherein the method further comprises determining the set of candidate inverse secondary transform matrices on the basis of a dimensional characteristic of the block.

12. A method in accordance with claim 9, the method further comprising selecting the inverse secondary transform matrix on the basis of the selection of a primary transform matrix.

13. A method in accordance with claim 12, the method further comprising applying no secondary transform dependent on the primary transform matrix being a predetermined character.

14. A method in accordance with claim 13 wherein the predetermined character of the primary transform matrix comprises that it be derived as an integer approximation of a discrete cosine transform used in the horizontal and vertical directions.

15. A method in accordance with claim 14 wherein the discrete cosine transform is DCT2.

* * * * *